July 26, 1960 O. A. BECKER 2,946,637

SELECTIVELY POWER-OPERATED DRAWER STRUCTURE

Filed March 7, 1957 8 Sheets-Sheet 1

INVENTOR
OTTO ALFRED BECKER
By Ostrolenk, Faber, Gerb & Soffen
ATTORNEYS

July 26, 1960 O. A. BECKER 2,946,637

SELECTIVELY POWER-OPERATED DRAWER STRUCTURE

Filed March 7, 1957 8 Sheets-Sheet 2

INVENTOR
OTTO ALFRED BECKER

BY Ostrolenk, Faber, Gerb & Soffen
ATTORNEYS

July 26, 1960 O. A. BECKER 2,946,637

SELECTIVELY POWER-OPERATED DRAWER STRUCTURE

Filed March 7, 1957 8 Sheets-Sheet 3

INVENTOR

OTTO ALFRED BECKER

By Ostrolenk, Faber, Gerb & Soffen

ATTORNEYS

SELECTIVELY POWER-OPERATED DRAWER STRUCTURE

Filed March 7, 1957

INVENTOR
OTTO ALFRED BECKER
By Ostrolenk, Faber, Gerb & Soffen
ATTORNEYS

SELECTIVELY POWER-OPERATED DRAWER STRUCTURE

Filed March 7, 1957 8 Sheets-Sheet 5

INVENTOR
OTTO ALFRED BECKER
By Ostrolenk, Faber, Gerb & Soffen
ATTORNEYS

July 26, 1960 O. A. BECKER 2,946,637

SELECTIVELY POWER-OPERATED DRAWER STRUCTURE

Filed March 7, 1957 8 Sheets-Sheet 6

INVENTOR
OTTO ALFRED BECKER
BY Ostrolenk, Faber, Gerb & Soffen
ATTORNEYS

INVENTOR
OTTO ALFRED BECKER
By Ostrolenk, Faber, Gerb & Soffen
ATTORNEYS

INVENTOR
OTTO ALFRED BECKER
By Ostrolenk, Faber, Gerb & Soffen
ATTORNEYS

United States Patent Office 2,946,637
Patented July 26, 1960

2,946,637

SELECTIVELY POWER-OPERATED DRAWER STRUCTURE

Otto Alfred Becker, Mainzer Strasse 201–209, Saarbrucken 3, Germany

Filed Mar. 7, 1957, Ser. No. 644,572
Claims priority, application Germany Mar. 16, 1956
8 Claims. (Cl. 312—223)

The present invention relates to apparatus for extending and retracting drawers or the like which are arranged in a desk, card file cabinet or the like, as has been described in the U.S. patent application "Power-Operable Extending and Retracting Device," Serial No. 589,475, of June 5, 1956, now Patent No. 2,873,159 of the same applicant. In a desk, card file cabinet or the like, which will be referred to as a desk for the sake of simplicity hereinafter, in which the drawers are automatically extended or retracted under control by push button keys or the like, it is desirable to couple the extending and retracting movements with each other. It is suitable to couple the retracting movement whereby a previously extended drawer is to be returned to its initial position within the desk with the extending movement of another drawer in such a manner that only the selector key associated with the newly selected drawer must be operated to cause an automatic movement of both drawers. To this end the invention provides oppositely moving drivers whereby all previously extended drawers including those in the other pedestal or pedestals of the desk, will be retracted.

Because it may also be desirable to extend another drawer, e.g. in another pedestal, without having to return the previously extended drawer into its initial position, the invention provides an uncoupling device whereby the drawer which is in its front end position is uncoupled from the actuating driver. In that case the drawer will remain in that position independently of the movements of all other drawers until the connection to one of the drivers is reestablished.

It is also suitable to enable each drawer to be arrested in any position during its movement. For this reason the invention provides spring-loaded non-latching selector keys whereby the drive motor moving the drawers is maintained in operation only as long as one of the selector keys is being depressed. The drawer can then be arrested in any desired position by releasing the selector key. The movement of the drawer can be resumed by re-pressing the selector key.

According to the invention two selector keys are provided for each drawer. One of said selector keys starts the drive motor in one direction, the other selector key starts the drive motor in the other direction. Depending on which of the oppositely moving drivers is disposed at the front end and which of them is disposed at the rear end of the drawers it will be necessary to move one or the other driver forwardly in order to extend a drawer; for this purpose the drive motor must be started in one sense or the other. According to another feature of the invention an indicating device will indicate to the operator in each case which of the two selector keys must be operated for this operation.

Provision is also made for deenergizing the motor upon a simultaneous actuation of two keys, which cause the electric motor to run in the left- and right-hand senses, respectively. Furthermore the invention provides to combine the motor switches with mechanical means so that only one switch for one sense of rotation of the motor is required for one half of all selector keys and only one second switch for the other sense of rotation is required for the other half of all selector keys. This applies to all pedestals of a desk and the drawers thereof. Likewise, only a single limit switch for the initial position and a single limit switch for the extended end position of all drawers and all pedestals are provided.

The invention provides also a special locking device whereby all drawers can be locked, e.g., after working-hours against unauthorized actuation and the motor circuit is interrupted at the same time.

One embodiment of the invention enables two persons facing each other to inspect and handle the contents (e.g. a card file or account file) of the various drawers in the same manner by causing a selective movement of the drawers. A special individual drive provided for each drawer makes the latter independent of all movements of other drawers. The drawer can selectively be fully extended towards both sides. In that case it is desirable to dispose the drive and the coupling members in the middle of the desk in order to provide for both operators the same amount of sitting space. Selector keys for controlling all operations are provided on both sides of the desk.

According to another embodiment of the invention a common drive is provided whereby the individual drives are caused to engage the drawers so that a rotary movement of the individual drives can directly cause the extending and retracting movements of the drawers.

According to another embodiment of the invention the drive acts on the extending carriages of the drawers rather than directly on the drawers themselves.

Finally the invention relates to a construction of the top plate of the desk in the form of covers, which are slidably movable one in the other. Thus the operators are enabled to lock into the desk pedestals from above.

Further details and advantages of the invention will become apparent from the following description of illustrative embodiments with reference to the drawing, in which—

Figures 4, 4A:
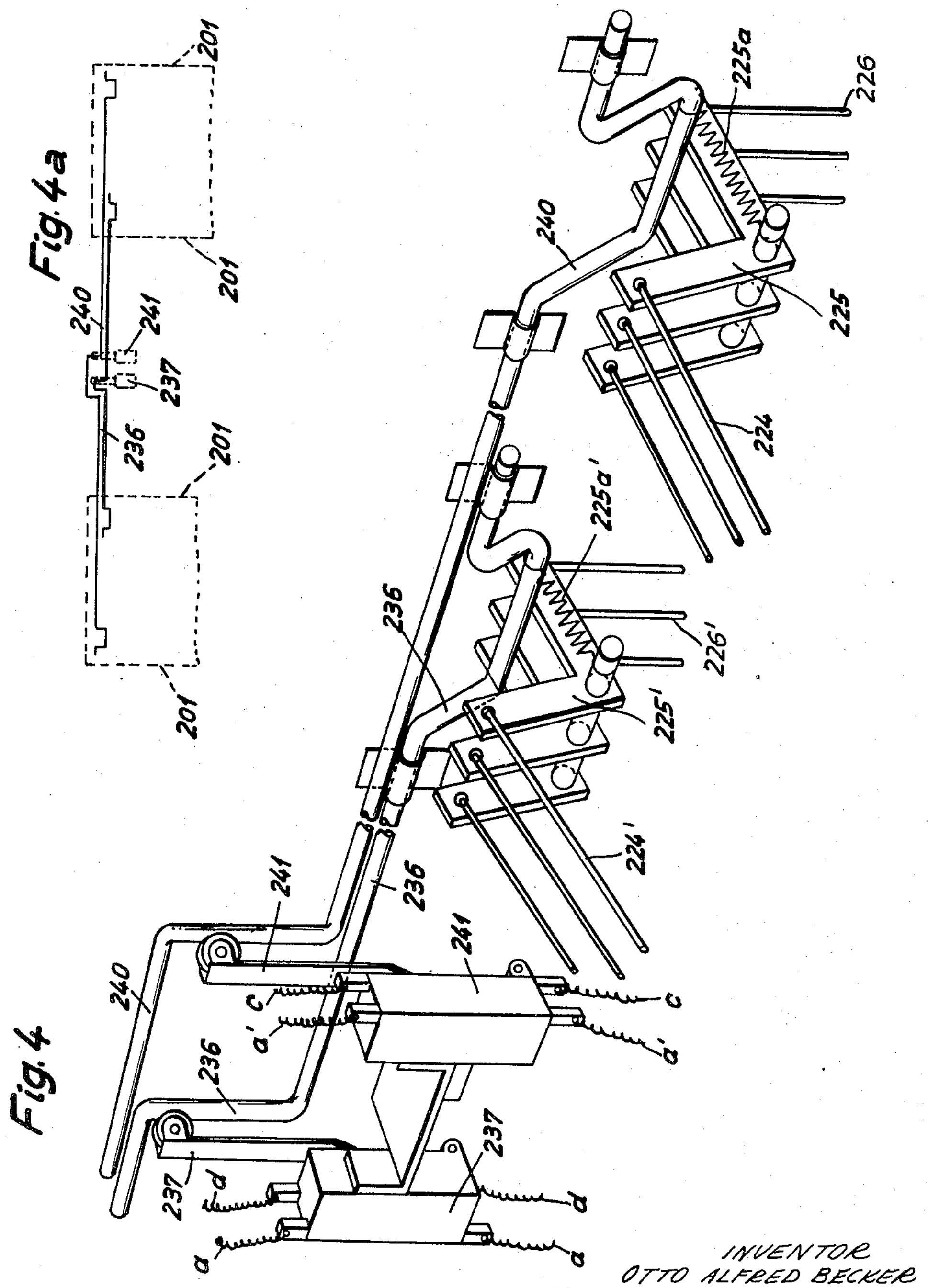
Fig. 4 is a perspective view showing a detail of the device for actuating the motor switch.

Fig. 4*a* is a diagrammatic view showing the entire actuating device for the motor switches.

Figure 5:
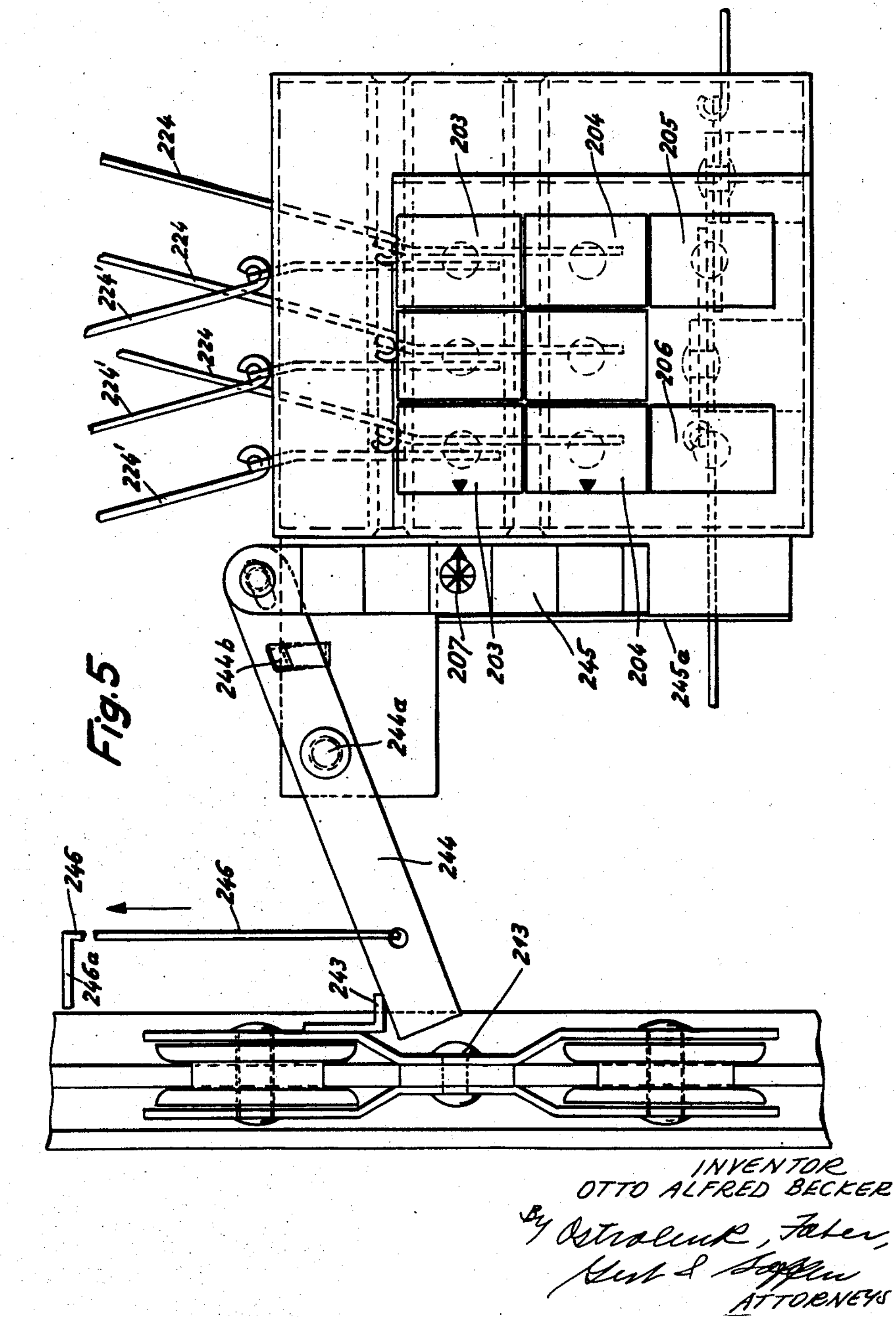

Fig. 5 is a top plan view showing the push button key arrangement and the appertaining indicating device with the top plate of the desk removed.

Figure 6:
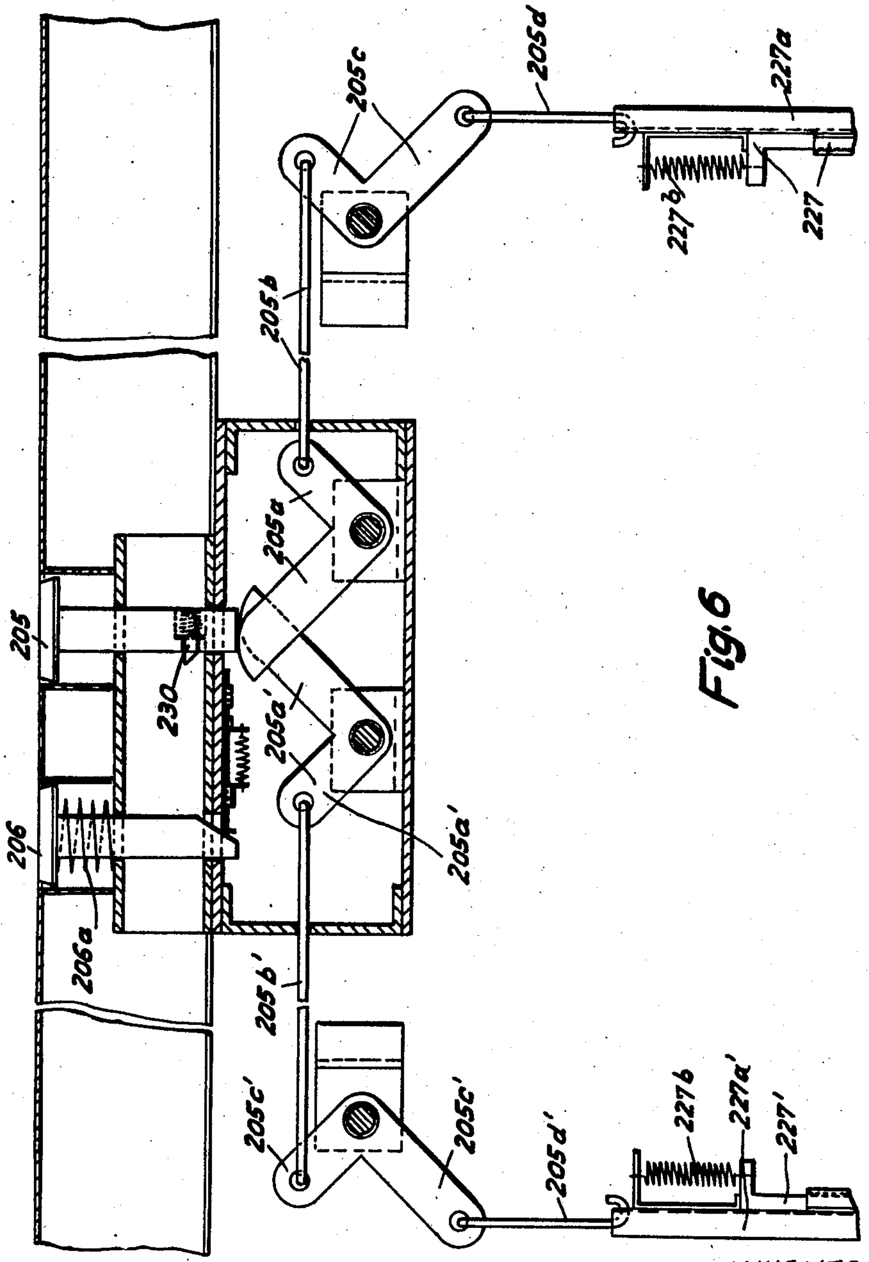

Fig. 6 is a front view showing part of the uncoupling device arranged at the front side of each pedestal.

Figure 7:
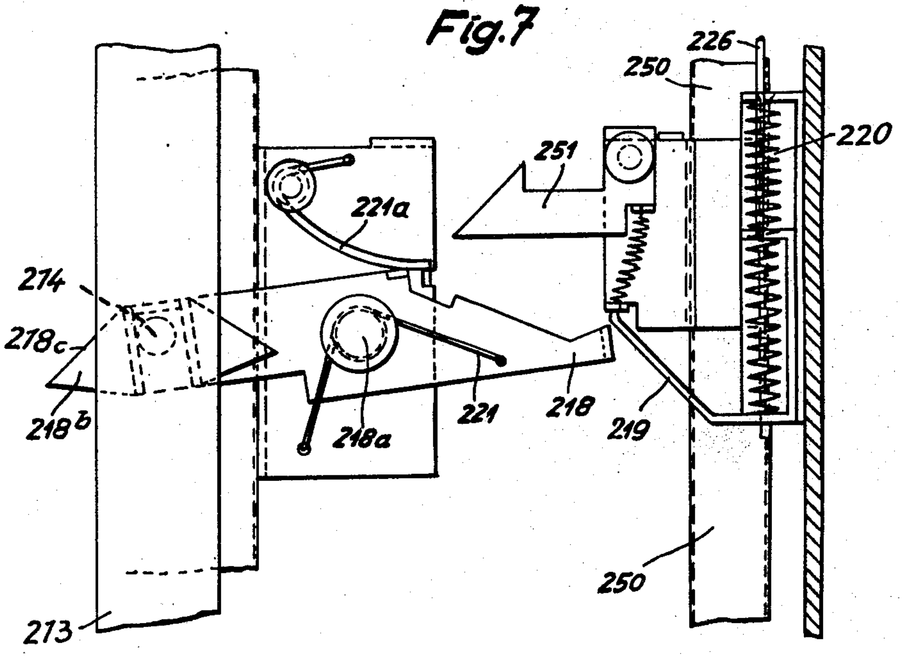
Figure 8:
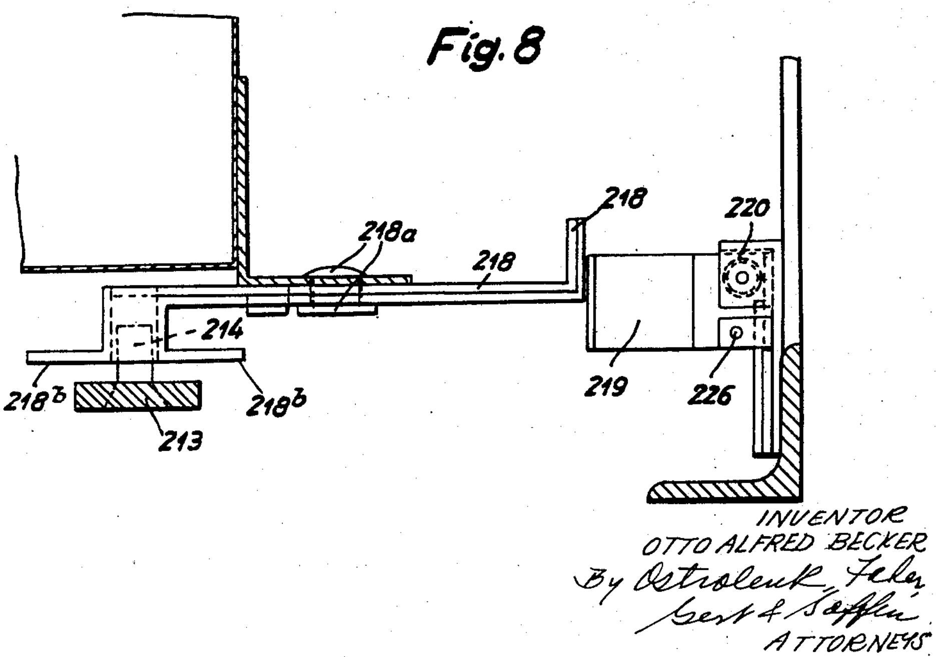

Figs. 7 and 8 are a side view and a top plan view showing a coupling lever for coupling the drawers to the drivers.

Figure 9:
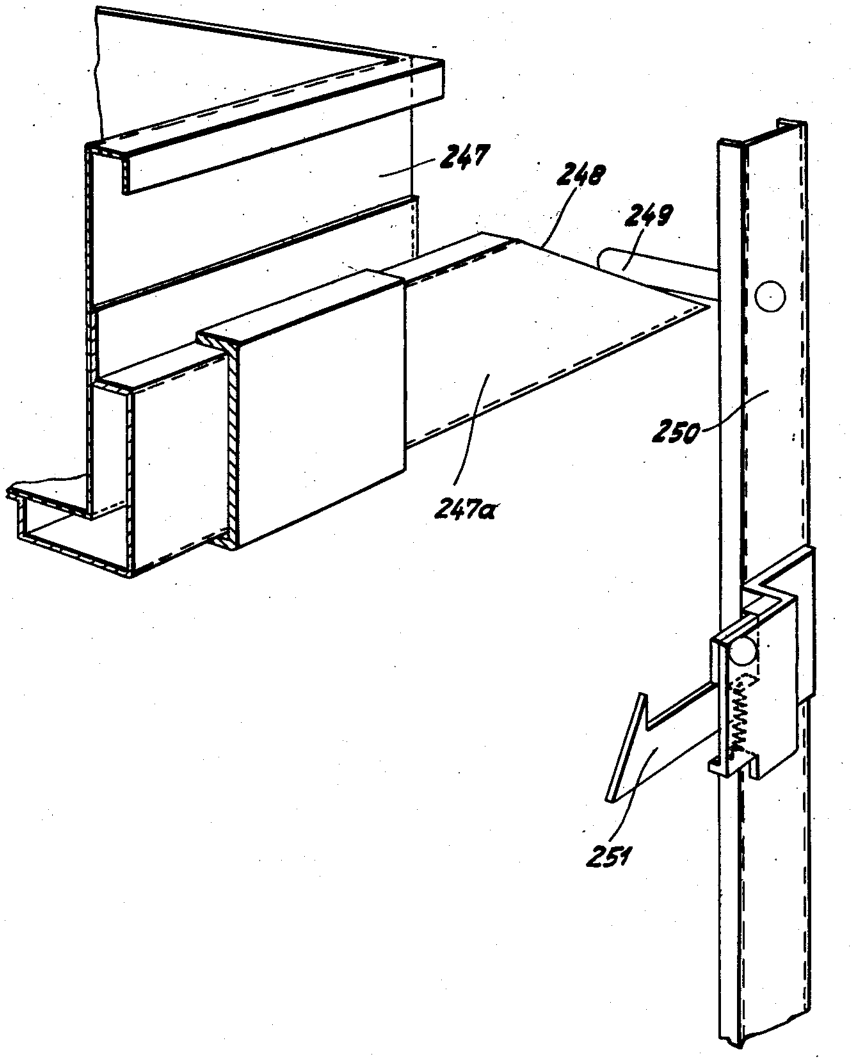

Fig. 9 is a perspective view showing part of the locking device.

Figure 1:
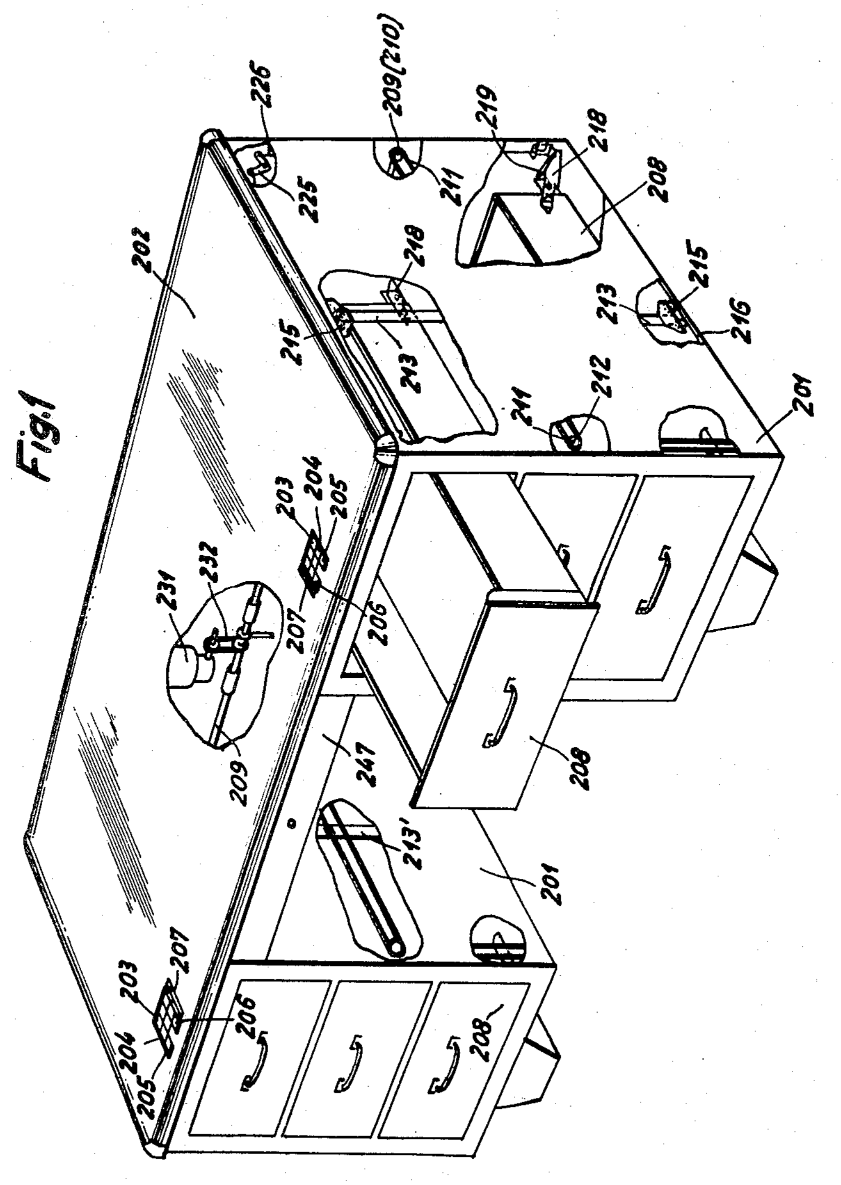
Fig. 1 is a perspective view of *a* desk which is operable from one side and comprises the apparatus according to the invention for extending and retracting the drawers.

Fig. 1 shows a desk having a table top 202, a central drawer 247 and two pedestals 201, in which the automatically extendable and retractable drawers 208 are accommodated. Push button keys 203—206 for actuating the drawers are provided above each pedestal at the front side of the table top.

Figure 3:
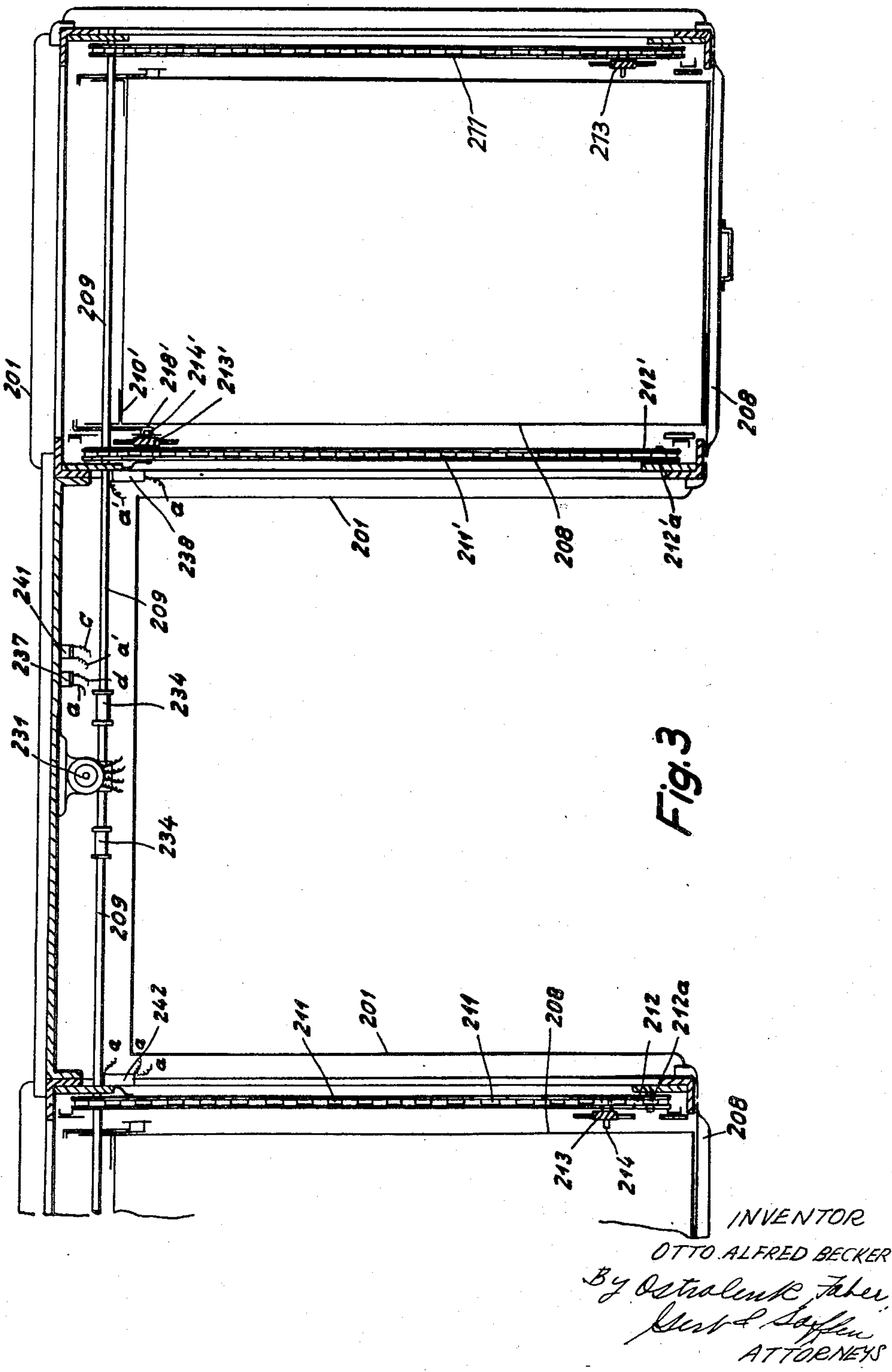
Fig. 3 is a horizontal cross-sectional view of the desk directly below the top plate.

An electric motor 231 arranged on the back wall of the desk serves as a drive means and will run in one or the other sense of rotation depending on the direction of the current flowing through it. This movement is transmitted by a chain drive 232 and resilient coupling members 234 (Fig. 3) to a horizontal drive shaft 209, which extends below the rear side of the table top. A hand-operable clutch (not shown) inserted between the motor and the drive shaft 209 enables the operator to disconnect the drive from the motor and to move the drawers by hand in the case of a failure of the automatic device or of the power supply.

The shaft 209 drives by means of sprockets 210 (Fig. 2) two horizontally extending endless chains 211 and 211' provided in each pedestal. As is apparent from Figs. 2 and 3 each pedestal comprises a driver rail 213 on one side and a driver rail 213' on the other side of the drawers. Both driver rails extend vertically and are arranged to be horizontally slidable. The driver rail 213 is firmly connected to the upper strand of the chain 211. The driver rail 213' is firmly connected to the lower strand of the chain 211'. Thus both driver rails will move in mutually opposite directions. Both driver rails are arranged so that one of them will be in its rear end position when the other is in its front end position.

Figure 2:
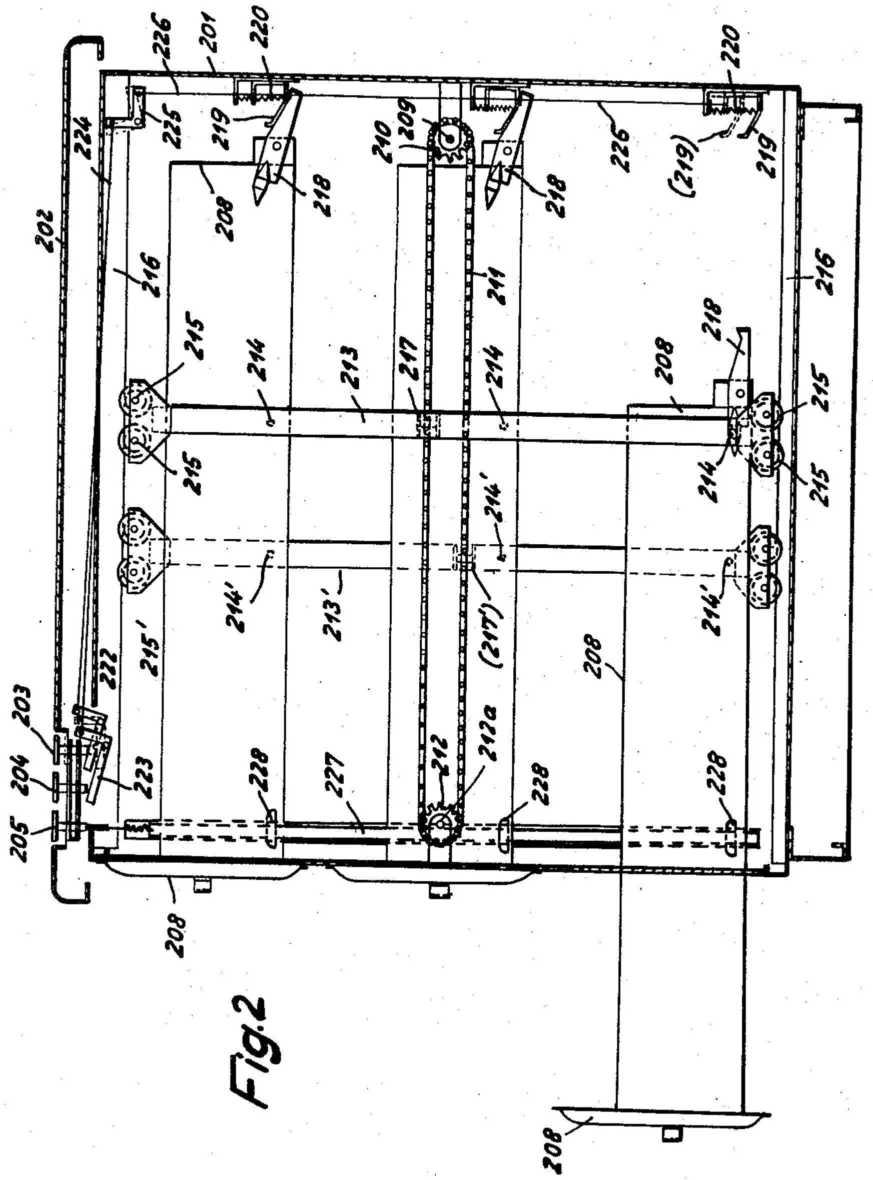
Fig. 2 is a vertical cross-sectional view of one of the desk pedestals.

A selector key 203 and a selector key 204 are associated with each of the three drawers of a pedestal (Figs. 2 and 5). Each of the selector keys 204 has connected thereto by means of a bell crank lever 223 a pulling wire 224, which is connected by one of three bell crank levers 225 arranged at the rear right-hand end of the pedestal to one of three vertically extending pulling wires 226. As will be described hereinafter each of said pulling wires 226 serves to couple the right side of one of the drawers to the driver rail 213.

In like manner the selector keys 203 are connected by pulling wires 224' and bell crank levers 225' arranged on the left side of each pedestal to vertically extending pulling wires 226', which serve for coupling the left sides of the drawers to the driver strip 213'.

A drawer to be extended will be coupled to that driver rail which is in its rear end position. To this end a coupling device is provided on each of the right and left sides of each drawer. Since both devices are symmetrical to each other it is sufficient to describe only the right-hand device hereinafter.

The driver rail 213 comprises three driver pins 214 facing the several drawers. A coupling lever 218 is pivoted on a pin **218*a* (Figs. 7 and 8) at the right-hand rear corner of each drawer. A wire spring 221 tends to move the coupling lever into the positions shown in Fig. 7, which is limited by another wire spring 221*a*. The head of the coupling lever is formed with an opening wherein the lever can receive the appertaining pin 214 of the driver rail 213. A vertically slidable release slide 219 is provided for each coupling lever at the rear wall of the pedestal and urged by a compression spring 220** to its lower position.

When a drawer is in its initial position, in which it is completely retracted in the pedestal, the rear end of the coupling lever 218 is forced down by the release slide to uncouple the drawer from the driver rail 213. This is shown in Fig. 2 for the two upper drawers. Each release slide is connected to one of the vertical pulling wires 226. A pressure on the appertaining selector key 204 will cause the release slide 219 to be lifted against the pressure of the spring 220 so that the coupling lever will swing in the counterclockwise sense under the action of its spring 221 and will embrace with its head the driver pin.

The pressing of a selector key 203 or 204 will also energize the motor 213 with the aid of the device shown in Figs. 4 and 4*a*. Two crankshafts 236, 240 are arranged below the rear end of the table top. As has been described the pressing of a selector key 203 causes one of the pulling wires 224' to swing one of the bell cranks 225'. Thus the crankshaft 236 is swung to energize by means of a switch 237 the drive motor

231 for running in such a sense of rotation that the lower strand of the endless chain 211' and with it the left-hand driver rail 213' will be moved forwardly. If, on the other hand, a selector key 204 is depressed, the crankshaft 240 is swung and the motor is started by means of the switch 241 to run in the opposite sense, whereby the right-hand driver rail 213 is moved forwardly.

The pressing of a selector key 203 or 204 belonging to a drawer will first couple the drawer to one driver rail and then close the circuit of the drive motor. The extending movement will continue until the depressed key is released to deenergize the motor or until the drawer has been entirely extended and actuates in its front limit position a limit switch (not shown), which deenergizes the motor. After the motor has been deenergized the drawer remains coupled to the driver rail.

When the drawer has reached its front limit position the driver rail not coupled to that drawer will be in its rear end position. When the selector key 203 or 204 belonging to another drawer is now depressed that drawer will be coupled to the rear driver rail and moved forwardly. Thus any drawer which has previously been fully extended is returned to its initial position by the other driver rail.

A special indicating device (Fig. 5) is provided to indicate to the person working at the desk which of the two selector keys 203 and 204 must be depressed in order to extend a drawer. When the driver rail 213' is in its front end position a star-shaped sign 207 of the indicating device will be aligned with the selector keys 203 arranged in a row. On the other hand, if the driver rail 213' is in its rear end position the star-shaped sign will be aligned with the selector keys 204. The indicating device consists of a two-armed lever 244, which is pivoted on a fixed pivot pin **244*a* and as long as none of the driver strips is in an end position is urged by a spring 244*b* to a position of rest, in which the star-shaped sign is aligned with the parting line between the selector keys 203 and 204**. In that position of the star-shaped sign both rows of selector keys can be operated as desired and a drawer which is in an intermediate position can be further extended or retracted.

On the other hand, if the driver rail 213' is in its front end position, as is shown in Fig. 5, it will exercise pressure by means of an engaging angle 243 on the left arm of the lever 244 to set the star-shaped sign to the selector keys 203. If the driver strip is in its rear end position it will exercise pressure by means of the engaging angle 243 on an angle **246*a*, which moves a pulling rod 246 connected to the lever 244 to the rear, whereby the lever 244 will be swung to a position in which the star-shaped sign 207 is aligned with the selector keys 204. When the star-shaped sign 207** is in one of the two last-mentioned positions the motor can be started only by a key in the indicated row whereas a special circuit (not shown) will ensure the motor to remain deenergized when the key of the other row is depressed.

The invention provides further that an extended drawer can be uncoupled from the driver rail so that the drawer will not be retracted but remain in its extended position when another drawer is being extended. To this end each pedestal comprises near its front wall uncoupling rails 227 and 227' vertically slidably arranged on both sides of the drawers. The upper ends of said rails are connected by means of bell crank levers **205*c*, 205*c'*, pulling bars 205*b*, 205*b'* and two bell crank levers 205*a*, 205*a'* to a push button key 205. Pressing the key 205 will cause the uncoupling rails to lift. The key is automatically locked in its lower position by a spring-loaded bolt 230 to maintain the uncoupling rails in their lifted position. A key 206 is provided to release that lock. When the uncoupling rails 227, 227' are in their upper position the heads of the coupling levers 218, 218' of the drawer or drawers disposed in their front position will be lifted and will thus be separated from the driver pin or pins 214** of the extended driver rail. A drawer which has thus been uncoupled will remain in its front position also when another drawer is being extended and can be moved by hand to any desired position.

An uncoupled drawer which is in any desired intermediate position must be prevented from being automatically coupled when one of its coupling levers engages the driver pin 214 of a driver rail which incidentally passes by during the extending or retracting movement of another drawer. In order to avoid this the head **218*b* of each coupling lever is formed to protrude out of the plane of the coupling lever 218 (Fig. 8). This is shown particularly in Figs. 7 and 8. Each head has two inclined cam faces 218*c*, which ensure that the head will be forced down by a driver pin 214 passing by. Thus the coupling lever (Fig. 7) will be swung in the counterclockwise sense and urge the spring 221*a* upwardly. After the driver pin has moved past the head the spring 221*a*** will restore the coupling lever to its position shown in Fig. 7.

When the release key 206 is depressed to return the uncoupling rails 227, 227' to their lower position, drawers which have previously uncoupled can be coupled in their front end position to the extended driver rail and can then be automatically retracted.

A locking device is provided to prevent an unauthorized actuation of the drawers. This locking device will become operative when the central drawer 247 of the desk has been fully retracted. Close to the central drawer each pedestal comprises at its rear end a vertically slidable locking rail 250 (Figs. 7 and 9), which carries spring-loaded latches 251, which can engage appropriate recesses (not shown) formed in the drawers. The central drawer 247 runs in guide rails **247*a*, which are formed at their rear ends with inclined cam faces 248. Pins 249 affixed to the locking rails are disposed within the range of movement of said cam faces. When the central drawer is fully retracted the two rails 250 will be lifted to lock the drawers 208 which are in their rear positions. The upward movement of the locking rails 250 will also interrupt the circuit of the motor 231** by means of a circuit breaker not shown.

I claim:

1. In a desk, card file cabinet or the like, comprising automatically extendable and retractable drawers two means which extend transversely to the direction of movement of the drawers and are movable in the direction of movement, one of said means being arranged on one common side of several drawers and the other being arranged on the other common side of said several drawers, conveyors extending in the direction of movement of said drawers and arranged to be driven by an electric motor, each of said conveyors being connected to one of said means in such a manner that one of said means will be in its front end position when the other is in its rear end position and the means perform mutually opposite movements when being driven, and a coupling device for selectively coupling individual ones of the drawers to one of the means.

2. In a desk, card file cabinet or the like, comprising automatically extendable and retractable drawers two means which extend transversely to the direction of movement of the drawers and are movable in the direction of movement, one of said means being arranged on one common side of several drawers and the other being arranged on the other common side of said several drawers, endless conveyor chains each of which is associated with one of said means and extends in the direction of movement of the drawer and is arranged to be driven by an electric motor by means of a sprocket, the upper strand of one conveyor chain being connected to one means and the lower strand of the other conveyor chain being connected to the other device in such a manner that one of said means will be in its front end position when the other is in its rear end position and the means perform mutually opposite movements when being driven, and a coupling device for selectively coupling individual ones of the drawers to one of the means.

3. In a desk, card file cabinet or the like, comprising automatically extendable and retractable drawers two means which extend transversely to the direction of movement of the drawers and are movable in the direction of movement, one of said means being arranged on one common side of several drawers and the other being arranged on the other common side of said several drawers, conveyors extending in the direction of movement of said drawers and arranged to be driven by an electric motor, each of said conveyors being connected to one of said means in such a manner that one of said means will be in its front end position when the other is in its rear end position and the means perform mutually opposite movements when being driven, each of said means carrying a driver pin for each drawer, coupling levers each of which is carried at the rear end of each of the two sides of a drawer, each of which sides are adjacent to one of said means, each of said coupling levers having in one end an opening adapted to receive the driver pin, and an actuating device for selectively coupling one coupling lever to one driver pin.

4. In apparatus according to claim 3, uncoupling rails arranged at the front end of the cabinet, desk pedestal or the like accommodating the drawers, each of said uncoupling rails extending on one side of said means and slidable in its longitudinal direction, a push button control for permanently displacing and for returning said uncoupling rail, projections carried by each of said uncoupling rails and associated each with one of the coupling levers of the drawers, said projection being disposed below the front end of the associated coupling lever when the drawers are in the front end position and being adapted to separate the coupling lever from the associated driver pin when the uncoupling rail is lifted.

5. In a desk, card file cabinet or the like, comprising automatically extendable and retractable drawers two means which extend transversely to the direction of movement of the drawers and are movable in the direction of movement, one of said means being arranged on one common side of several drawers and the other being arranged on the other common side of said several drawers, conveyors extending in the direction of movement of said drawers and arranged to be driven by an electric motor, each of said conveyors being connected to one of said means in such a manner that one of said means will be in its front end position when the other is in its rear end position and the means perform mutually opposite movements when being driven, each of said means carrying a driver pin for each drawer, coupling levers each of which is carried at the rear end of each of the two sides of a drawer, each of which sides are adjacent to one of said means, each of said coupling levers having in one end an opening adapted to receive the driver pin, spring-loaded slides fixedly arranged in the desk, each of said slides being associated with one coupling lever and under its spring loading unlatching the associated coupling lever when the appertaining drawer is in its rear end position, push button keys each of which is associated with one of said slides and connected thereto with the aid of bell crank levers and pulling wires to counteract the spring loading.

6. In a device according to claim 5, bell crank levers arranged on one side of the drawers, each of said bell crank levers being inserted in one of the pulling wires leading from the keys to the slide for the appertaining drawer, a common shaft for all bell crank levers associated with one drawer side, a crankshaft having a cranked portion swingably arranged inside the bell crank levers and under the influence thereof, and an electric switch operable by another cranked portion of the crankshaft to energize for rotation in one sense of rotation the electric motor driving the drawers, and a similar arrangement of bell crank levers, crankshaft and switch for the other drawer side whereby the electric motor is started in the other sense of rotation.

7. In apparatus according to claim 5, an indicating device which is actuated by one means and indicates which one of two possible push button keys is to be depressed for extending a drawer when the means are in their end positions.

8. In a desk, card file cabinet or the like, comprising automatically extendable and retractable drawers two means which extend transversely to the direction of movement of the drawers and are movable in the direction of movement, one of said means being arranged on one common side of several drawers and the other being arranged on the other common side of said several drawers, conveyors extending in the direction of movement of said drawers and arranged to be driven by an electric motor, each of said conveyors being connected to one of said means in such a manner that one of said means will be in its front end position when the other is in its rear end position and the means perform mutually opposite movements when being driven, each of said means carrying a driver pin for each drawer, coupling levers each of which is carried at the rear end of each of the two sides of a drawer, each of which sides are adjacent to one of said means, each of said coupling levers having in one end an opening adapted to receive the driver pin, and an actuating device for selectively coupling one coupling lever to one driver pin, the head end of the coupling lever receiving the driver pin projecting out of the plane of the coupling lever towards said means and having guide portions adapted to permit the head of the coupling lever of a drawer which is in an intermediate position to evade the driver pin of a means passing by, and a spring arrangement for the coupling lever, which is arranged to move the coupling lever to a position suitable to initiate the evasion.

References Cited in the file of this patent

UNITED STATES PATENTS

| | | |
|---|---|---|
| 750,384 | Moore | Jan. 26, 1904 |
| 847,479 | Jackson | Mar. 19, 1907 |
| 1,595,117 | Norman | Aug. 10, 1926 |
| 2,187,012 | Brenner | Jan. 16, 1940 |
| 2,621,995 | Zenner et al. | Dec. 16, 1952 |
| 2,829,022 | Lewis | Apr. 1, 1958 |